Sept. 27, 1932.  C. W. JOHNSON  1,879,287
STEERING COLUMN BUSHING
Filed Dec. 19, 1928

Inventor
Carl W. Johnson
By Jay Oberlin & Fay
Attorneys

Patented Sept. 27, 1932

1,879,287

UNITED STATES PATENT OFFICE

CARL W. JOHNSON, OF SHAKER HEIGHTS, OHIO, ASSIGNOR TO THE CLEVELAND GRAPHITE BRONZE COMPANY, OF CLEVELAND, OHIO, A CORPORATION OF OHIO

STEERING COLUMN BUSHING

Application filed December 19, 1928. Serial No. 327,091.

The present invention, relating, as indicated to steering column bushings, is more particularly directed to an improved composite bushing for use either in steering columns or in other mountings where the service is not particularly heavy, but where a bearing is required that will compensate for slight irregularities of manufacture in the dimensions of the housing in which the bearing is to be placed and the shaft or member which is to be journaled in the bearing. A further object of the invention is the provision of a composite bearing of the character described which may be inexpensive to manufacture and in which the various parts may be integrated to provide a single unit.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various mechanical forms in which the principle of the invention may be used.

In said annexed drawing:—

Figure 2:
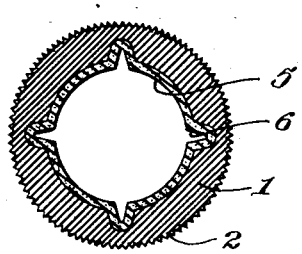
Figure 1:
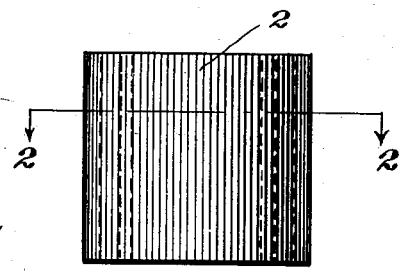
Figure 3:
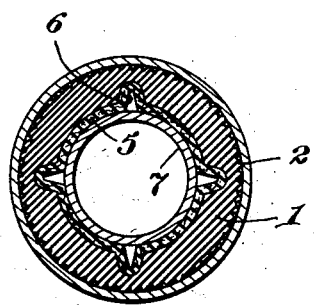

Fig. 1 is a side elevation of my improved bearing; Fig. 2 is a transverse section through the same on the line 2—2, Fig. 1; Fig. 3 is a transverse section showing my improved bearing mounted in a suitable housing; and Fig. 4 is a similar partial section on an enlarged scale.

In steering columns and similar apparatus it is necessary to journal a rotatable or oscillatory shaft within a suitable housing, and for this purpose it is desirable to employ relatively inexpensive bearings as the service thereon is not severe although it is necessary that the fits between bearing and housing and the bearing in the shaft be such that there will be no looseness or noise in operation. For this purpose a bearing is commonly used which consists of an outer shell of plastic material, such as rubber, provided with an inner shell either of metal or of some material such as hard rubber. In the latter case the hard rubber lining is split into sections to permit this liner to accommodate itself to shafts of slightly different dimensions. I have developed a bearing of this same general type in which, however, an inner shell of bearing material is provided and which may be formed in a single piece without any split, and which is nevertheless expansible to accommodate itself to varying shaft dimensions.

In Fig. 1 there is shown my improved bearing consisting of an outer shell 1 of plastic material, such as soft rubber, provided with a serrated outer surface adapting the bearing to be compressed slightly to thereby snugly fit within a non-expansible housing 3, which in the case of a steering column is the outer tubular element within which the steering shaft is mounted. The outer shell 1 is provided with an integral inner lining 5 formed of a material such as hard rubber impregnated with graphite, this lining being formed in four segments connected by means of U-shaped necks 6. The shell 5 is formed in a single piece, but is slightly expansible by reason of the looped portions 6 which bend slightly and open slightly, allowing the inside diameter of the shell 5 to be expanded to permit this shell to slip over a shaft 7, the outside diameter of which is slightly larger than the normal inside diameter of the lining.

Figure 4:
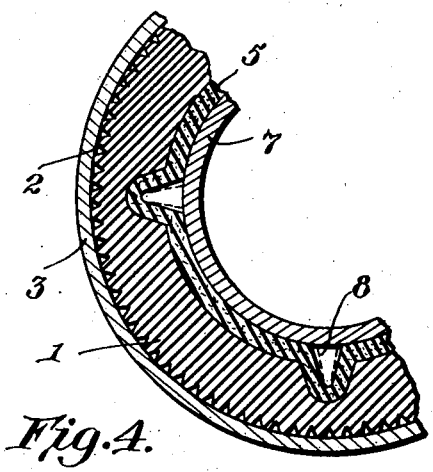

In Figs. 3 and 4 the bearing is shown mounted within a tubular non-expansible outer shell 3, which forms the housing, and about a shaft 7. The shaft 7 is of slightly larger diameter than the inside diameter of the lining 5 and the latter has been spread slightly, the walls of the loops 6 being spread from the position indicated in dotted lines 8 to the positions shown in the solid lines to accommodate the liner to the shaft 7.

It will be understood that in such constructions it is difficult to economically hold the outside diameter of the shaft and the inside diameter of the housing to close limits and the present bearing is adapted to be used with these slightly varying sizes of housing and shaft, since both the outer shell and the inner lining accommodate themselves within reasonable limits to these varying dimensions.

The present bearing may be very economically manufactured as the inner lining and the outer shell may be vulcanized together during the vulcanization of the outer shell so that a single operation is sufficient to complete and assemble the bearing after the formation of the inner lining. At the same time the inner shell is to an extent self-lubricating by reason of the introduction of graphite into the material forming the same and for intermittent or light service such a bearing is entirely satisfactory without the use of any other lubricant.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. A bearing of the character described comprising an outer shell of expansible material and an endless inner shell integrally united to said outer shell and provided with a radially outwardly extending looped portion permitting expansion of said inner lining.

2. A bearing of the character described comprising an outer shell of compressible material and an inner shell integrally united thereto and consisting of a plurality of segments, the adjacent segments being integrally connected by flexible radially outwardly extending loops permitting expansion of said lining.

Signed by me, this 30 day of Nov., 1928.

CARL W. JOHNSON.